US007243335B1

(12) United States Patent
Andrew et al.

(10) Patent No.: US 7,243,335 B1
(45) Date of Patent: Jul. 10, 2007

(54) METHOD AND SYSTEM FOR REDUCING CODING COMPLEXITY BY PROVIDING INTELLIGENT MANIPULABLE DEFAULTS

(75) Inventors: Felix G. T. I. Andrew, Seattle, WA (US); Ian M. Ellison-Taylor, Seattle, WA (US); Mark S. Carroll, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/506,125

(22) Filed: Feb. 17, 2000

(51) Int. Cl.
*G06F 9/45* (2006.01)
*G06F 17/00* (2006.01)

(52) U.S. Cl. .................. 717/115; 715/513; 715/522; 717/144

(58) Field of Classification Search .............. 717/143, 717/141, 144, 115; 715/517, 522
See application file for complete search history.

(56) References Cited

U.S. PATENT DOCUMENTS

| 4,899,136 | A |  | 2/1990  | Beard et al. |
| 5,127,104 | A |  | 6/1992  | Dennis |
| 5,371,675 | A |  | 12/1994 | Greif et al. |
| 5,376,241 | A |  | 12/1994 | Walsh |
| 5,412,717 | A |  | 5/1995  | Fischer |
| 5,499,335 | A |  | 3/1996  | Silver et al. |
| 5,546,525 | A |  | 8/1996  | Wolf et al. |
| 5,563,997 | A |  | 10/1996 | Fisher |
| 5,577,250 | A |  | 11/1996 | Anderson et al. |
| 5,623,591 | A |  | 4/1997  | Cseri |
| 5,651,108 | A |  | 7/1997  | Cain et al. |
| 5,694,561 | A |  | 12/1997 | Malamud et al. |
| 5,745,712 | A |  | 4/1998  | Turpin et al. |
| 5,809,230 | A |  | 9/1998  | Pereira |
| 5,815,703 | A |  | 9/1998  | Copeland et al. |
| 5,838,317 | A |  | 11/1998 | Bolnick et al. |
| 5,844,554 | A |  | 12/1998 | Geller et al. |
| 5,855,015 | A |  | 12/1998 | Shoham |
| 5,884,083 | A |  | 3/1999  | Royce et al. |
| 5,887,139 | A | * | 3/1999 | Madison et al. ............ 709/223 |
| 5,905,492 | A |  | 5/1999  | Straub et al. |
| 5,935,210 | A |  | 8/1999  | Stark |
| 5,980,090 | A |  | 11/1999 | Royal, Jr. et al. |
| 5,983,245 | A |  | 11/1999 | Newman et al. |
| 5,999,944 | A | * | 12/1999 | Lipkin ..................... 707/104.1 |
| 6,083,276 | A | * | 7/2000  | Davidson et al. ........... 717/107 |
| 6,121,984 | A |  | 9/2000  | Andrew |
| 6,125,385 | A |  | 9/2000  | Wies et al. |
| 6,252,593 | B1 |  | 6/2001 | Gti |

(Continued)

OTHER PUBLICATIONS

Tim Bray et al., ed., "Extensible Markup Language (XML) 1.0," Feb. 10, 1998, W3C, REC-xml-19980210, pp. i-iv, 1-32.*

(Continued)

*Primary Examiner*—Eric B. Kiss
(74) *Attorney, Agent, or Firm*—Merchant & Gould

(57) ABSTRACT

A method and system is provided for allowing designers, who are primarily concerned with the look and feel of the program, to modify the dialogs in an application being developed without having to rely on the developers to generate executable code in each iteration. Intelligent defaults for parameters that are either not specified in a resource definition or governed by a common style specification are provided to facilitate switching from one dialog element to another without requiring that all of the parameters be specified again.

26 Claims, 6 Drawing Sheets

U.S. PATENT DOCUMENTS

| | | | |
|---|---|---|---|
| 6,268,852 B1 | 7/2001 | Lindhorst et al. | |
| 6,298,474 B1 | 10/2001 | Blowers et al. | |
| 6,332,154 B2 | 12/2001 | Beck et al. | |
| 6,336,214 B1* | 1/2002 | Sundaresan | 717/143 |
| 6,342,907 B1 | 1/2002 | Petty et al. | |
| 6,348,927 B1 | 2/2002 | Lipkin | |
| 6,370,141 B1 | 4/2002 | Giordano, III et al. | |
| 6,370,508 B2 | 4/2002 | Beck et al. | |
| 6,393,569 B1 | 5/2002 | Orenshteyn | |
| 6,415,298 B1 | 7/2002 | Oesterer et al. | |
| 6,446,256 B1* | 9/2002 | Hyman et al. | 717/143 |
| 6,476,833 B1 | 11/2002 | Moshfeghi | |
| 6,480,855 B1 | 11/2002 | Siefert | |
| 6,546,419 B1 | 4/2003 | Humpleman et al. | |
| 6,560,621 B2 | 5/2003 | Barile | |
| 6,603,488 B2 | 8/2003 | Humpleman et al. | |
| 6,615,253 B1 | 9/2003 | Bowman-Amuah | |
| 6,678,889 B1 | 1/2004 | Burkett et al. | |
| 6,769,115 B1 | 7/2004 | Oldman | |

OTHER PUBLICATIONS

Elliotte Rusty Harold, "XML Bible," 1999, IDG Books Worldwide, Inc., pp. iii, iv, 3-15, 146-147, 323, 334-335, 414-415.*

David Megginson, "Structuring XML Documents," 1998, Prentice Hall PTR, oo, vii-ix, xxxi-xxxiii, 4-5, 21-23, 28-32, 87, 215-218,235-242.*

"Adobe® FrameMaker®+SGML 5.5: Developing SGML Publishing Applications," 1997, Adobe Systems, Inc.,pp. 1-18.*

Charles F. Goldfarb and Paul Prescod, "The XML Handbook™, " 1998, Prentice Hall PTR, pp. vii-ix, 276-385.*

Junichi Suzuki and Yoshikazu Yamamoto, "Leveraging Distributed Software Development," Sep. 1999, IEEE Computer, vol. 32, No. 9, pp. 59-65.*

"Microsoft® Computer Dictinary," 2002, Microsoft Press, 5th ed., pp. i, ii, 544.*

Elliotte Rusty Harold, "XML Bible," 1999, IDG Books Worldwide, Inc., pp. 336-337.*

Microsoft Press. *The Windows Interface Guidelines for Software Design*. Redmond, Washington. 1995. pp. i-xx, 2-556.

Microsoft Corporation. *Chapter Seven An Introduction to Application Resources*. [web page] 1999. http://msdn.microsoft.com/library/partbook/win98dh/chaptersevenintroductiontoapplicationresources.htm. [Accessed Oct. 21, 1999]. p. 1.

Microsoft Corporation. *Child Window and Dialog Box Procedures*. [web page]1999. http://msdn.microsoft.com/library/partbook/win98dh/childwindowdialogboxprocedures.htm. [Accessed Oct. 18, 1999]., pp. 1-2.

Microsoft Corporation. *Adding and Editing Resource Elements*. [web page]. 1999. http://msdn.microsoft.com/library/partbook/win98dh/addingeditingresorceelements.htm. [Accessed Oct. 21, 1999]. pp. 1-3.

Microsoft Corporation. *Viewing and Changing Resource Identifers*. [web page]. 1999. http://msdn.microsoft.com/library/partbook/win98dh/viewingchangingresourceidentifiers.htm. [Accessed Oct. 21, 1999].pp. 1-2.

Finocchio, Mark. *Microsoft Developer's Network CD: Control Spy Exposes the Clandestine Life of Windows Common Controls, Part I*. Microsoft Corporation, Jul. 1999. pp. 1-17.

Finocchio, Mark. *Microsoft Developer's Network CD: Control Spy Exposes the Clandestine Life of Windows Common Controls, Part II*. Microsoft Corporation, Jul. 1999. pp. 1-21.

Microsoft Corporation. *CreateDialog*. [web page]. 1999. http://msdn.microsoft.com/library/wcedoc/wcesdkr/uif_ac_44.htm. [Accessed Oct. 18, 1999]. pp. 1-2.

Microsoft Corporation. *CreateDialog*. [web page]. Sep. 28, 1999. http://msdn.microsoft.com/library/psdk/winui/dlgboxes_4hwn.htm. [Accessed Oct. 18, 1999]. pp. 1-2.

Microsoft Corporation. *DialogProc*. [web page]. 1999. http://msdn.microsoft.com/library/wcedoc/wcesdkr/kf_de_8.htm. [Accessed Oct. 18, 1999]. pp. 1-2.

Microsoft Corporation. *WM_INITDIALOG*. [web page]. 1999. http://msdn.microsoft.com/library/wcedoc/wcesdkr/uim_uw_65.htm. [Accessed Oct. 18, 1999]. pp. 1-2.

Dr. Gui. Microsoft Corporation. *Dr. GUI Does Data with XML*. [web page]. Oct. 20, 1997. http://msdn.microsoft.com/library/Welcome/dsmsdn/msdn_guixml.htm. [Accessed Oct. 18, 1999]. pp. 1-7.

Dr. Gui. Microsoft Corporation. *Scripting Your Options*. [web page]. Nov. 10, 1997. http://msdn.microsoft.com/library/Welcome/dsmsdn/msdn_guiscript.htm. [Accessed Oct. 18, 1999]. pp. 1-5.

Dr. Gui. Microsoft Corporation. *Should Your Next UI Be Written in Dynamic HTML?*. [web page]. Nov. 3, 1997. http://msdn.microsoft.com/library/Welcome/dsmsdn/msdn_guidhtml.htm. [Accessed Apr. 14, 2000]. pp. 1-4.

Microsoft Corporation.,*Dynamic Link Libraries*. [web page]. 1999. http://msdn.microsoft.com/library/partbook/win98dh/dynamiclinklibraries.htm. [Accessed Oct. 21, 1999]. p. 1.

Microsoft Corporation. *Editing Modes*. [web page]. 1999. http://msdn.microsoft.com/library/devprods/vs6/vinterdev/vidref/viconeditingmodes.htm. [Accessed Oct. 18, 1999]. pp. 1-6.

Microsoft Corporation. *Header Files* . [web page]. 1999. http://msdn.microsoft.com/library/partbook/win98dh/headerfiles.htm. [Accessed Oct. 21, 1999]. p. 1.

Microsoft Corporation. *Linking Resources*. [web page]. 1999. http://msdn.microsoft.com/library/partbook/win98dh/linkingresources.htm. [Accessed Oct. 21, 1999]. p. 1.

Microsoft Corporation. *The Message-Handling Structure*. [web page]. 1999. http://msdn.microsoft.com/library/partbook/win98dh/themessagehandlingstructure.htm. [Accessed Oct. 18, 1999]. pp. 1-2.

Microsoft Corporation. *Messages and Event-Driven Programming*. [web page]. 1999. http://msdn.microsoft.com/library/partbook/win98dh/messageseventdrivenprogramming.htm. [Accessed Oct. 18, 1999]. pp. 1-3.

Microsoft Corporation. *Opening Project and Resource Files*. [web page]. 1999. http://msdn.microsoft.com/library/partbook/win98dh/openingprojectresourcefiles.htm. [Accessed Oct. 21, 1999]. pp. 1-3.

Microsoft Corporation. *The Template.RC Script*. [web page]. 1999. http://msdn.microsoft.com/library/partbook/win98dh/thetemplatercscript.htm. [Accessed Oct. 18, 1999]. pp. 1-2.

Microsoft Corporation. *Types of Resources*. [web page]. 1999. http://msdn.microsoft.com/library/partbook/win98dh/typesofresources.htm. [Accessed Oct. 18, 1999]. pp. 1-2.

Microsoft Corporation. *Using a Resource Editor*. [web page]. 1999. http://msdn.microsoft.com/library/partbook/win98dh/usingresourceeditor.htm. [Accessed Oct. 21, 1999]. pp. 1-2.

Microsoft Corporation. *Files and File Types*. [web page]. 1999. http://msdn.microsoft.com/library/partbook/win98dh/filesfiletypes.htm. [Accessed Oct. 18, 1999]. pp. 1-2.

Microsoft Corporation. *The Windows.H Header File*. [web page]. 1999. http://msdn.microsoft.com/library/partbook/win98dh/thewindowshheaderfile.htm. [Accessed Oct. 21, 1999]. p. 1.

Microsoft Corporation. *The WinMain Procedure*. [web page]. 1999. http://msdn.microsoft.com/library/partbook/win98dh/thewinmainprocedure.htm. [Accessed Oct. 18, 1999]. pp. 1-7.

Microsoft Corporation. *The WndProc Procedure*. [web page]. 1999. http://msdn.microsoft.com/library/partbook/win98dh/thewndprocprocedure.htm [Accessed Oct. 21, 1999]. pp. 1-3.

Microsoft Corporation. *Message Loop Alternatives*. [web page]. 1999. http://msdn.microsoft.com/library/partbook/win98dh/messageloopalternatives.htm. [Accessed Oct. 18, 1999]. pp. 1-2.

Bergin et al., "Java Resources for Computer Science Instruction," *ITiCSE Working Group Papers*, vol. 30, No. 4, pp. 18b-38b (Dec. 1998).

Kaiser et al., "An Architecture for WWW-based Hypercode Environments," *ICSE '97*, ACM, pp. 3-13 (1997).

Fielding et al., "Web-based Development and Complex Information Products," *Communications of the ACM*, vol. 41, No. 8, pp. 84-92 (Aug. 1998).

* cited by examiner

METHOD AND SYSTEM FOR REDUCING CODING COMPLEXITY BY PROVIDING INTELLIGENT MANIPULABLE DEFAULTS

TECHNICAL FIELD

This invention relates generally to the manipulation and design of user interfaces and, more particularly, relates to the development of applications, usually by utilizing an iterative strategy.

BACKGROUND OF THE INVENTION

Creating valuable application programs requires more than just programming ability. There is an increasing appreciation for the need for aesthetics and ease of use in the design of user interfaces. To term the new user interfaces design strategies in cutting edge software as being "ergonomic" is not an overstatement. The rapid rate of obsolescence in software has further increased the pressure to create increasingly sophisticated application programs complete with bug free code and friendly interfaces in a short period of time or risk missing the small window of economic opportunity.

A traditional application program includes source code, usually, organized in several modules defined by different roles in the program's logical layout. Following compilation, these modules are linked to form an executable program. This simplistic picture is modified significantly in the modern programming paradigm. Thus, in the popular "WINDOWS®" operating system environment found in operating systems manufactured by the "MICROSOFT®" corporation of Redmond, Wash., application development typically requires generation of several different files types that cooperate to give effect to an application.

A "WINDOWS®" application program typically has an executable file that creates, directly or indirectly by making appropriate calls, one or more "WINDOWS®" elements to implement a user interface. In addition, the placement and appearance of these elements is expected to conform to rules in agreement with certain styles. Such styles include, e.g., "The WINDOWS® Interface Guidelines for Software Design" published in 1995 by the MICROSOFT® Press," ISBN 1-55615-679-0.

In addition, unlike earlier programming paradigms, in a "WINDOWS®" environment, there are files with code modules such as dynamic link library (DLL) files, resource files, library files and other file types that are used to generate an application. A respectable application may depend on thousands of files to handle the different scenarios that may develop in course of its execution. Of particular interest are the resource files that include information relevant to the design and implementation of the graphical elements shown on the screen, and even multimedia interactivity.

Although resource files contain data, such as parameters, bitmaps for icons, font and color choices and the like for rendering graphical symbols, they cannot be treated as merely data files that may be accessed at runtime due to their dynamic use in giving effect to the user interface. Some user interface elements, i.e., "WINDOWS®" elements, of interest include dialog boxes, message boxes, drop-down lists, menus, toolbars and even audio effects. Each user interface element needs to be invoked at the right time and place with modifications for accomplishing a particular purpose, and at the same time it is expected to conform to a style or deviate from it for a reason.

Some user interface elements convey information to the user while others also collect information, and all, preferably, add to the experience of the user. The placement and details of the design implementation are preferably controlled by parameters supplied in resource files, which may be edited with the help of programming tools and resource editors, available in some environments, or by directly modifying the application source code.

This, in turn, has resulted in focusing attention on the process of designing and developing application programs. As may be expected, cost is an important consideration in the development of improved computer programs. Programmers skilled in writing code for applications are expensive, and programmers having an additional feel for the aesthetic needs of the ordinary consumer are even more precious. Consequently, in developing an application a division of labor between the "designers" and the "developers" has proven to be cost effective. Developers specialize in coding, debugging and similar programming related tasks while "designers" are so designated due to their skill in designing the look and feel of an application. Many designers lack the coding prowess of the average developer and conversely, many developers lack the presentation skills that a designer brings to the job.

One of the strategies in designing user interfaces is to make the interface predictable, i.e., conform to a style while draw attention to other parts of the interface by drawing attention to it due to failure to conform to a style or user expectation. Thus, a designer would be expected to pick and choose which of the style rules to follow or modify. On the other hand, use of the programming tools and editors requires considerable training and technical knowledge since, potentially, rest of the application source code could be corrupted by what may appear to be minor errors to the uninitiated.

A common difficulty in managing such a diverse team is the need for the developers to implement the smallest changes made by the designers as they experiment with different layouts. Each time the designers try out a new look in course of settling on an effective layout, the developers modify the application code, compile and link the code and then call on the designers to evaluate the result. This is an expensive operation.

Apart from the need for countless meetings between designers and developers, the time taken in developing an application includes several cycles, termed "build," each build typically taking two to three days. At the end of a build the different component parts of an application are ready to be operated together (as opposed to being tested separately. Thus, desirable management of the application development process preferably reduces the tedium for the developers while leaving the designers unfettered and, at the same time, reducing costs and the time required for getting the application ready for shipping.

Another situation that results in the need for modifying primarily the user interface in an otherwise finished application is while porting the application from one linguistic and cultural context to another. This may result in changes in the style, size, associated text and appearance of the graphical controls to accommodate text, larger or smaller fonts, handedness, different designs and the like. Some of these changes are predictable within a particular context, while other changes require insight and skill to generate an effective presentation in the new context. Advantageously, it is possible to make many of the changes without requiring developer input. An application for a U.S. patent application Ser. No. 09/452,421, filed on Dec. 1, 1999 teaches a method and system for making resource files external to application programs such that changes to the resource files can be made by the designers in a markup language with the aid of suitable tools without necessarily requiring developer input and is incorporated in its entirety by reference. This still leaves much to be done by the designers as they provide initialization parameters, details for the relative placement of controls and other mundane tasks in course of giving shape to a user interface.

SUMMARY OF THE INVENTION

In view of the foregoing, the present invention provides a method and system for developing software application programs, particularly resource files, so that sensible defaults are included without requiring any action by the designer along with a reduction in coding complexity by programmers in general. Thus, a designer has to provide instructions for specifying deviations from the norm while implementing various user interface embodiments in course of developing a satisfactory look and feel for the application program. The resource files are preferably implemented as external files coded such that the information from the resource files may be obtained at runtime as needed without the need for compilation. Furthermore, the external resource file may be edited at runtime to allow designers to modify the look and feel for an application's interface without having to make extensive and duplicative changes requiring any more handling of code than is necessary.

This is enabled by the use of a markup language in the resource file to allow the resource file to be parsed on the fly at runtime along with default style specifications being made available in the same, or another, markup language as well. Routines are provides to locate the relevant resource file and parse the markup language therein in response to a request for a resource. Such routines can be provided as part of the services offered by the operating system. In addition, scripts may be used to provide interactive interfaces. Furthermore, an application is easily ported to a different linguistic and cultural context by allowing a switch between different default style specifications to provide modified defaults without requiring extensive resource parameter modifications.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
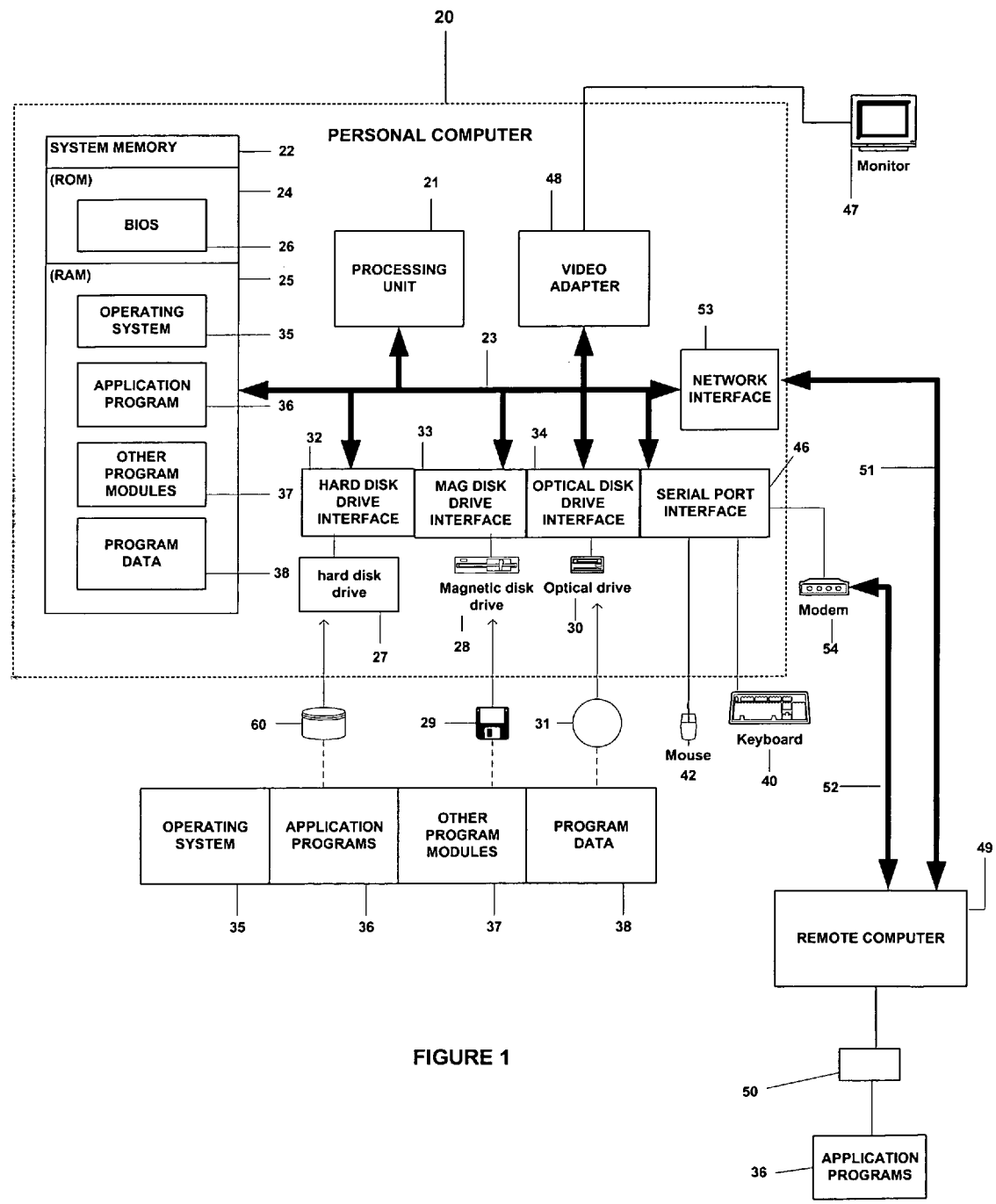
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. In particular, distributed computing based on dynamic networks that can reconfigure themselves with a device providing functionality, such as a video display, to another device is intended to be included.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the context of resource files used by applications to implement user interfaces while executing in an exemplary computing environment, it is useful to consider some graphical controls. Table 1 presents a sampling of controls that are typically found in graphical interfaces. This list is not intended to be exhaustive, and instead, is illustrative of the some of the behaviors made possible by different graphical elements. It is to be noted that additional graphical controls, including those with audio and video properties are being developed and being continually released. Thus, "graphical controls" and other similar terms should be understood to include audio/video capable elements. Graphical objects accept parameters for positioning the graphical object and generate events that may be handled by the application in course of interacting with a user. In addition, many operating environments may require the use of one or more Application Programming Interface (API) to properly invoke and manage the graphical controls. For instance, in the "WINDOWS®" operating system environment several APIs are available for setting up, modifying, communicating with and tearing down graphical controls. The skill required to implement such controls is a daunting task for many designers. Furthermore, the continual release of new controls both provides a rich environment for designers to develop interesting looking interfaces provided they could function without having to become skilled programmers.

TABLE 1

| Description | Options | Notifications |
| --- | --- | --- |
| Status bar: displays information defined by an application. | Simple-mode - having only section; and Multi-mode - displaying more than one type of information in their respective sections. | May generate events corresponding to mouseovers or mouse clicks over a particular section. |
| Button: a bitmap displaying selected text. | Can associate text or selected bitmaps to modify its appearance. | May generate events corresponding to mouseovers or mouse clicks over a particular section. |
| Dialog box: displays a text message. | Can associate selected text. | May generate events corresponding to mouseovers or mouse clicks over a particular section. |
| Tool bar: displays a collection of buttons in a bar. | Can associate selected text or pictures. | May generate events corresponding to mouseovers or mouse clicks over a particular section. |
| Tool tip: displays text explaining the tool function. | Can associate selected text. | May generate events corresponding to mouseovers over a particular button or another graphic. |
| Trackbar: displays a scrolling control with a slider and a set of notches. | Can associate text and numbers with the scale. | May generate events corresponding to mouse-dragging events. |
| Spin box: displays arrows in an updown control. | Can specify location and size. | May generate events corresponding to mouse-clicks over a particular section. |

Figure 2:
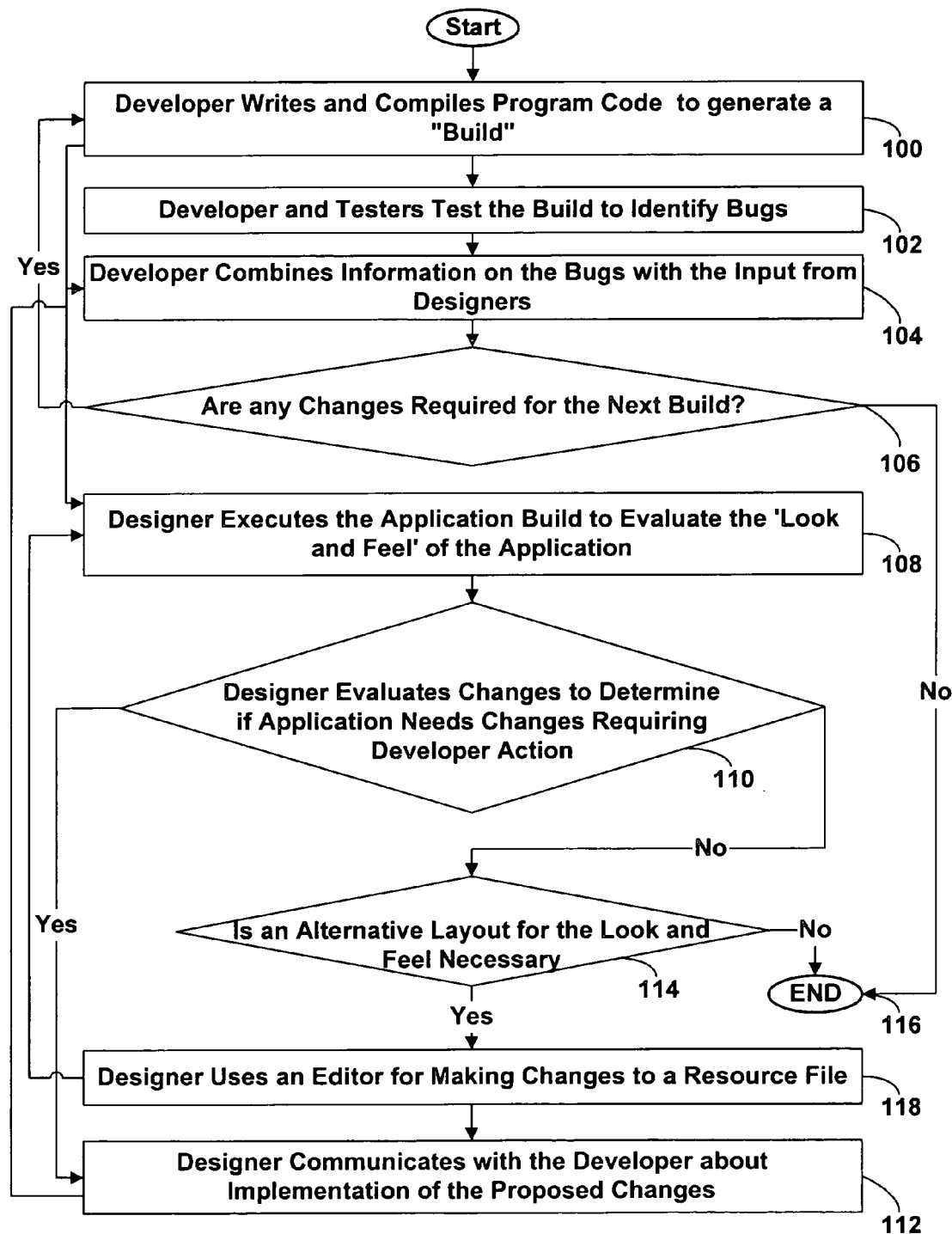
FIG. 2 is a schematic providing an overview of a typical application development process in a possible embodiment.

FIG. 2 is a flow diagram illustrating an application development environment comprising a designer and a developer. It should be noted that several designers and/or developers usually participate in a typical project. Thus the description here is not intended to be limiting as to the composition of suitable teams in a particular project. A Developer provides a build at step 100 in this embodiment. However, it should be understood that this need not always be the first step since it is possible to test a user interface using something less than a complete build. The application is executed (step 102) in order to assess the stability of the build and identify "bugs," which are flaws that are inevitably found in sophisticated application programs or routines being tested. Such sleuthing often requires sophisticated programming skills and serves to identify the next build, which aims to fix the defects. The knowledge about changes for fixing the bugs is combined with suggestions from the designer to determine the changes needed for generating the next build (step 104). Armed with the knowledge about bugs, whether derived from testing the build themselves, or obtained from others including beta testers and, of course the designer, the developer determines the changes to be made in the code (step 106), which results in another build and loops back to step 100.

The development of a build at step 100 also facilitates independent evaluation of the build by the designer (step 108), who evaluates the look and feel of the application to determine if the aesthetic impact and ease of use of the application is acceptable. The designer decides if the application requires changes that require developer action (step 110). Identification of such changes results in communicating with the developer (step 112), which communication naturally leads to a determination of changes needed for a new build (step 106) followed by a new build (step 100). Of course, it should be understood that the developer is typically not precluded from contributing to the aesthetic aspects and similarly every designer is not always prevented from contributing code.

On the other hand, if, at step 110, the designer decides that at least some changes do not require prior developer action, the possibility of a desirable alternative layout is determined (step 114). If no changes are required then the procedure ends (step 116), at least for this build. Else, the designer introduces the changes to implement the alternative layout, preferably with the help of a tool that removes the need to directly edit the markup language, in the resource file (step 118). A suitable tool may, e.g., provide a graphical environment for making the changes using drag and drop techniques. These changes can be evaluated on the same build for evaluating the aesthetic appearance of the application (step 108), thus completing an iteration by the designer in course of improving the application without requiring developer action. It should be noted that this description is intended to include the possibility that within a given build some changes may be handled by the developer while other changes are handled by the designer. The overall effect is to reduce the development time since the designer does not need to wait for the developer to produce a build corresponding to most changes.

Preferably, the designer should not have to concern himself or herself with the file naming conventions and the precise syntax required for the storing the data. These constraints are addressed in a preferred embodiment by using a markup language to store data in the resource data-containing file.

A markup language uses symbols to define commands or routines, usually, for locating and displaying information. Such symbols effectively divide textual information into text that is to be interpreted as a command, comment or data to be displayed. A popular overarching markup language specification is the standard generalized markup language (SGML). While SGML does not provide a usable markup language itself, derivatives based on it are able to provide different functions by providing the necessary implementation details left open in SGML. A familiar markup language is the hypertext markup language (HTML) used for most web-based communications. Another rapidly maturing standard derived from SGML is the extensible markup language (XML), which is particularly suited for data exchange across the web. XML permits that use of schemas and document type definitions to prescribe the details for the implementation of a particular set of tags. It should be understood that although a preferred embodiment uses a particular XML based specification, termed resource markup language (RCML), alternative markup language specifications and strategies such as accessing information providing routines at runtime are intended to be included within the scope of the specification. Some functions may also be provided by the use of scripts for providing even further interactivity as is well known to one of ordinary skill in the art, including the use of scripts in the context of a markup language.

Figure 3:
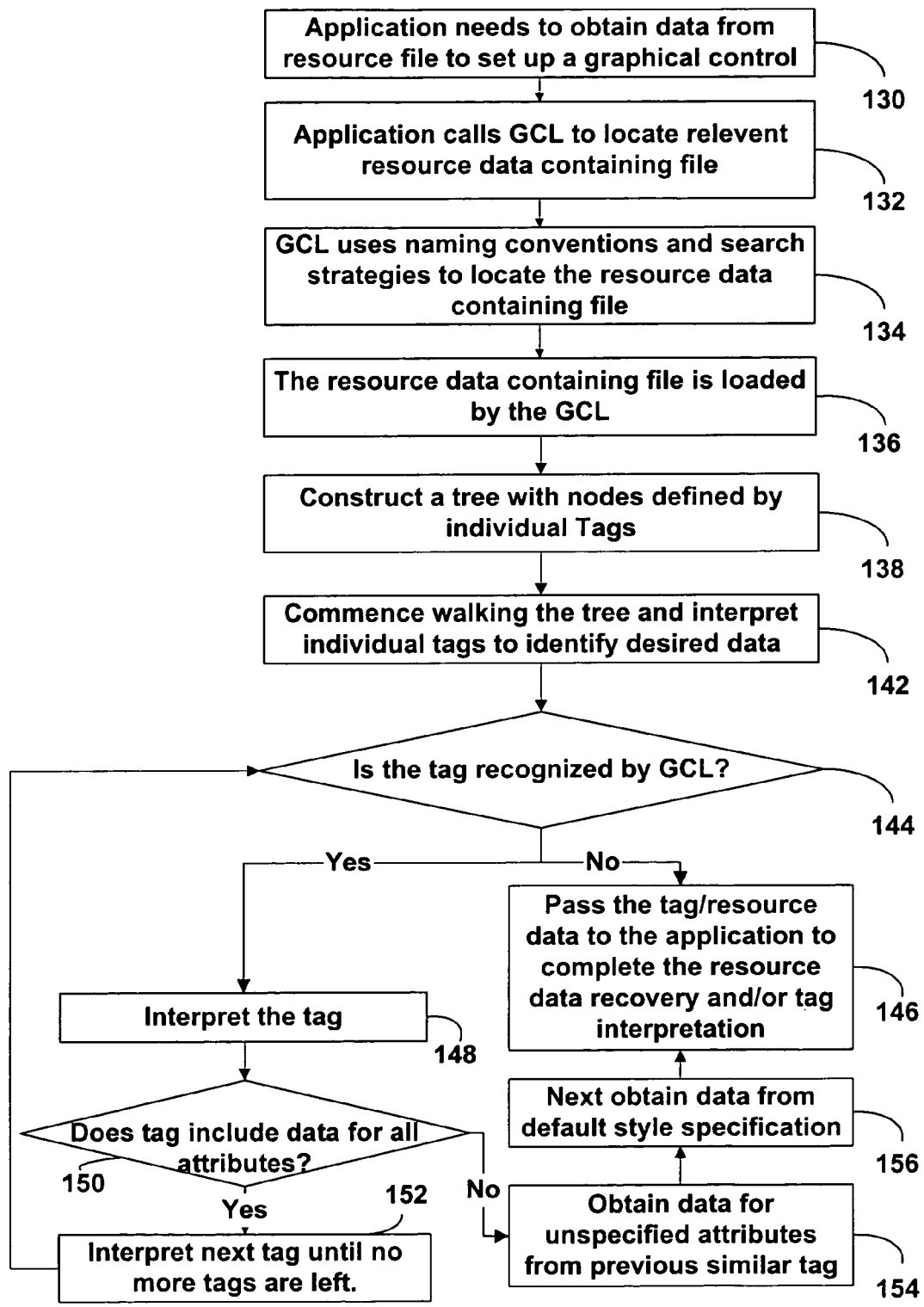
FIG. 3 is a schematic illustrating a high level overview of the development of an application.

FIG. 3 illustrates some broad concepts underlying many of the embodiments implemented in accordance with the invention. Broadly speaking an application requests that a particular graphical element be implemented (step 130). The operating system, following a sequence of one or more calls, provides a locating routine, termed here as a Graphical Control Locator (GCL), for locating a resource file containing the desired information (step 132) although similar routines from sources other than the operating system could be used as well. The GCL uses a defined strategy reflecting a file naming scheme and a systematic search of possible paths to locate the requested resource (step 134), which is loaded by GCL (step 136). In some embodiments, failure to locate the resource data may result in the application being asked to provide a coded version of the resource data to be used as the default. An advantageous search strategy allows overriding the version of resources coded in the application code by external resource files by looking for application coded functionality only in the absence of external resource files. Thus, it provides easily modifiable resources without the risk of having an inoperative application due to unavailable resource data-containing files.

A tree is constructed next by parsing the text in the file to identify "tags" followed by adding the tag to the tree as a node until all possible tags are used up (step 138). Tags, in a markup language, are customarily represented by text enclosed by "<" and ">" brackets. In the case of RCML a tag results in some behavior optionally using attributes specified in the context of the tag, or provided elsewhere. A closing tag, distinguished by the additional presence of the "/" symbol is required to mark the other end of the text to be operated upon. For instance "<HTML>" is a tag identifying a particular markup language. "</HTML>" is the corresponding closing tag. The use of a closing tag is required in XML based markup languages.

Following the construction of the tree, it is "walked" (step 142). In course of walking the tree, the tree is traversed and the actions prescribed by the nodes carried out. In a possible embodiment, if a particular tag is not recognized by GCL (step 144), the tag information may be ignored, or preferably, communicated to the application (step 146), or some other prescribed routine for interpretation. Else, it is supplied to a routine for implementing an appropriate graphical control (step 148) along with required contextual identifiers or handles. A check is made to determine if all of the required attributes are available in the context of the tag (step 150). If all of the required attributes are available the control moves over to interpret the next tag or exits if no more tags are left be interpreted (step 152)

If all of the attribute values required for the implementation are not available in the context of the tag then the attribute values are obtained by an ordered strategy. First, a previous occurrence of the tag in the tree is preferably used to obtain missing attribute values. This is a useful strategy since alignment or style information can be obtained from the previous occurrence while reducing the work required of the designer in course of aligning a plurality of dialog boxes or drop down menus. These attribute values are chosen while avoiding overlapping controls (step 154). If acceptable attributes are not available at the prior occurrence, then the default style specification is used to identify desirable values for the attribute (step 156). This sequence of seeking information allows a designer to avoid having to repeatedly specify attributes that override the style defaults. In other embodiments, of course, some tags may preferably be provided with overriding attributes explicitly only. For instance, adding an attribute "RELATIVE," with value "YES" or "NO" would specify if the attributes from the previous control should be used to derive all or some of the attributes for a given tag. A possible sequence of commands may appear as:

<BUTTON DEPUSH="TRUE" ID="1" WIDTH="50" HEIGHT="14" TEXT="OK" X=""120" Y="7"/>

<BUTTON ID="2" TEXT="Cancel" RELATIVE="YES">
  <LOCATION EDGE="3" Y="+3">

</BUTTON>

In the above sequence the position of button 2, the "Cancel" button, is specified relative to button 1 by marking the value for attribute "RELATIVE" as "TRUE." Specifically, the Y coordinate for button 2 is advanced by 3 units while retaining the values for the X coordinate, the height and width from the specification for button 1. In both of the buttons some of the attributes, such as the font and the like are obtained from the style specifications, e.g., in step 156 in FIG. 3. Naturally, in some embodiments the value for "RELATIVE" may be supplied in the default or style specification to be "TRUE," thus making it necessary to actually specify it only when many or all of the attributes are taking values not specified in preceding tags' attributes.

If acceptable values for the attributes are still not obtained then they may be provided by the application (step 146), or the user through preferences such as large fonts for accessibility reasons or ignored. Thus, the resource data file may include tags that are not specified in the schema or document type definition of RCML but may be handled by the application or even handled in only some of the implementations.

Preferably, the resource data-containing file is closed when the stored parameters stored therein are no longer needed. It should be noted that in some embodiments there may be several resource data-containing files in a single application while in other embodiments a single resource data-containing file may be used with the application preferably requesting data corresponding to a particular node, i.e., graphical control.

In a preferred embodiment, the GCL, application and the graphical control rendering routines communicate using defined messaging systems. For instance, in a "WINDOWS®" environment, the GCL is a resource loader provided by the operating system. The application calls the resource loader to locate a resource file, which is located by using the name of the application since external resource files are labeled with a resource identifier appended to the end of the application name, e.g., "APPLICATION-101.RCML." Alternatively, the identifier is used to retrieve a particular resource from a resource file. The resource loader uses the standard strategy of searching the directory where the application resides before searching alternative locations. If it fails to locate the resource file then the code available in the application is used in response to a message sent to the application. The resource loader parses the resource file in accordance with a schema specified for RCML, although other embodiments may use a document-type-definition or other strategies well known to one of ordinary skill in the art.

Since the logically many of the graphical controls are "WINDOWS®" elements owned by other "WINDOWS®" elements, the call to the resource loader may include a parent or owning "WINDOWS®" element's handle along with a handle for the invoking application instance. The data in the resource file, read in accordance with the parameter specifications, is sent to the relevant child "WINDOWS®" element using the messaging service API provided by the operating system. In effect all communication between the different components is managed by standard operating system components with the notable exception of the resource loader, which is an additional component provided by the operating system. This implementation allows systematic invocation of the child "WINDOWS®" elements, which may continue to exist with their own handles allocated by the operating system, at least in some implementations, even if the parent "WINDOWS®" element is closed. Some of these "WINDOWS®" elements may generate events in response to user actions that would again result in the messaging system being invoked to produce the desired response. Such events may be handled at the level of the child "WINDOWS®" element or by the resource loader itself. Other events may trigger the parent "WINDOWS®" element or even the application.

Figure 4:
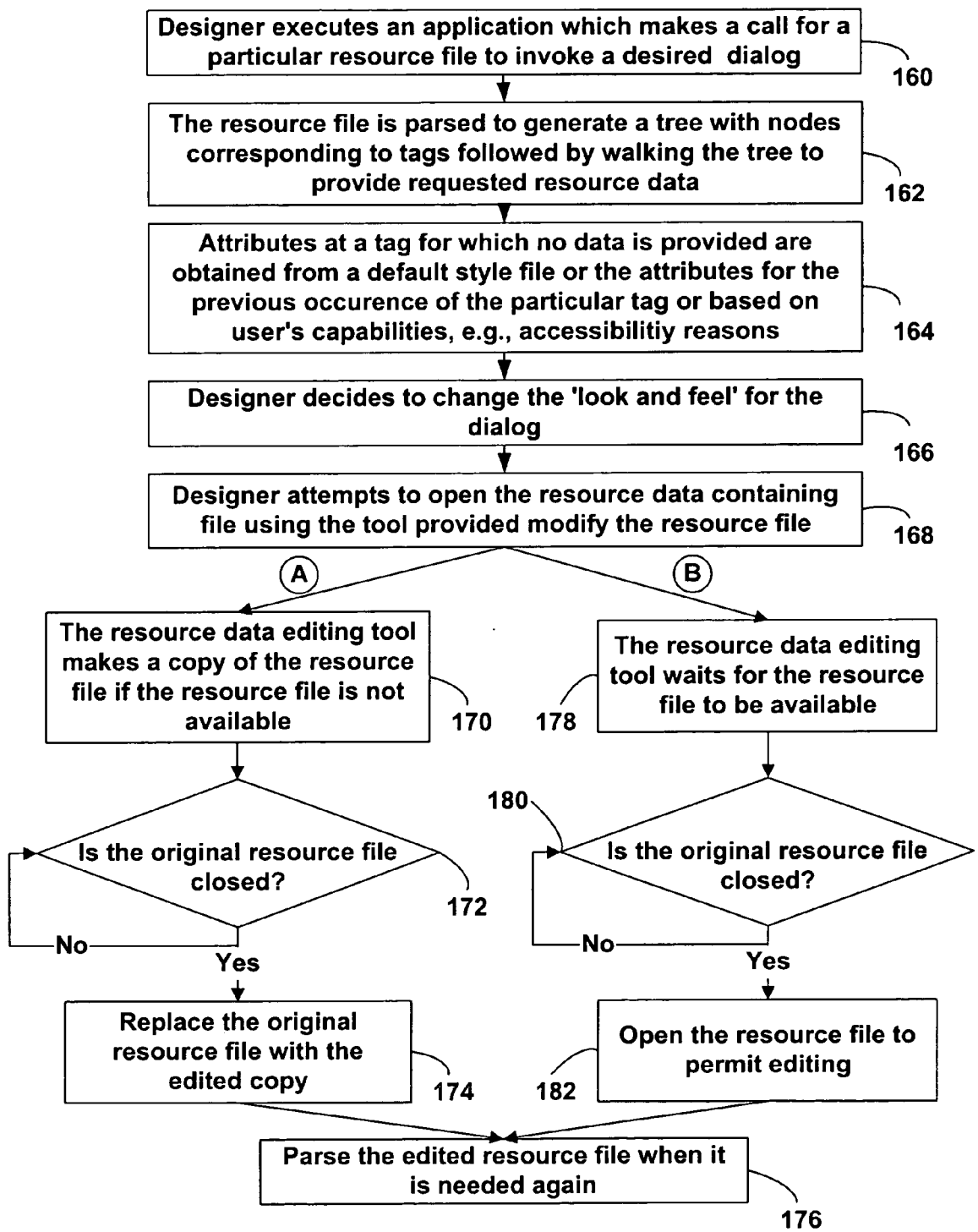
FIG. 4 shows an embodiment where a user edits a resource file while an application is executing with unspecified attributes being obtained from defaults.

FIG. 4 illustrates an embodiment where a user can edit a resource file preferably using a tool such as a resource data editor while the corresponding application is executing. The use of a markup language allows editing of the resource data since the text can be parsed again efficiently to implement changes at runtime. Preferably, the resource data-containing file is closed prior to opening it for editing, although a copy of the file may be made for facilitating editing and invoked after the earlier version is closed along with replacement of the earlier version by the edited version. Additional variations including providing options for saving different versions of a resource file can be advantageously provided in other embodiments in accordance with the invention.

This flexible handling of the resource data results in the designer being able to modify the appearance of the application while it is executing since the markup language in the resource file is preferably parsed afresh when needed again. Typically, in some embodiments of the invention, a designer receives a build of an application and proceeds to tweak its 'look and feel' by first executing the application (step 160). When the application needs to invoke a dialog control, the resource data-containing file is accessed, parsed and walked in course of providing data to the dialog control element (step 162). Attributes for which data is not explicitly provided are obtained from the values specified for the previous occurrence of the tag or a style specification, or even the application (step 164), and in some embodiments in that order. The style specifications may be organized using RCML to allow construction of a parsed tree that may be used at runtime. Thus, setting up a new control does not require the explicit specification of a large number of parameters to initialize the control, and instead these can be obtained from the style specifications provided in a RCML format.

A particularly significant expenditure of time and effort is required in course of aligning controls. For instance, it is often desirable to place a label next to a control. If the label is moved, the control should be moved as well or vice versa. Or several buttons, e.g., "OK," "Cancel," and "Retry" may be required to be aligned and have the same width. Changing the width or the position of one of the buttons results in a need to modify the remaining buttons as well. Implementing such changes can easily consume significant time. However, allowing subsequent buttons to refer to the preceding controls' properties ensures that the changes cascade down without any need for fine-tuning by the designer and, in a manner of speaking, the "Cancel" and "Retry" buttons inherit their width and height from the "OK" button by allowing attributes to select for such inheritance.

Returning to FIG. 4, examination of the appearance of the dialog control persuades the designer to experiment with another look (step 166). The designer attempts to edit the resource data using the tool provided for the purpose (step 168). The tool attempts to open the resource file and may provide different behaviors in various embodiments, some of which are described next.

In an embodiment A, the editing tool makes a copy of the resource file to allow the designer to proceed with editing (step 170). Following editing the tool waits for the original resource file in use to be closed (step 172). If the original resource containing data file has been closed, it is replaced by the edited resource file (step 174) and it is this new resource data file that is parsed and walked if the application again requests the resource (step 176). Notably, the new resource data file is created without requiring the designer to specify redundant information, i.e., only data necessary to effect changes has to be entered. The remaining information is obtained from the intelligent defaults as is illustrated, e.g., in FIG. 3.

In an exemplary embodiment B, the resource editor may choose to wait until the resource data-containing file is closed (step 178) by checking the status of the resource file of interest (step 180). When the resource file becomes available, it is edited (step 182) and invoked at the next request for the resource data, which results in this modified file being parsed and walked. Notably, the new resource data file is edited without requiring the designer to specify redundant information, i.e., primarily the data necessary to effect changes has to be entered. Furthermore, this is not intended to exclude embodiments that utilize different strategies for editing resource data. Such strategies include, e.g., an error returned upon attempting to access a resource data-containing file in use, possibly with a message posted if the editable resource data is available. Or, the resource data editing tool may be grayed out while the resource file is unavailable, or a second copy of the resource file parsed and walked.

In many application development scenarios the basic application may be executing satisfactorily, but the graphical controls may be less than appealing. This may happen, e.g., in porting an application from one language to another or even to another cultural context while keeping the language the same. In such a situation, naturally, the lion's share of the work is expected to be design work. However, much of the design work may require merely specifying a more appropriate style, which, then, may be further modified by the designers developing an acceptable user interface.

In yet another embodiment, the packaged application is shipped with an external resource data-containing file that may be edited by a user with the help of a resource data-editing tool. This is in contrast to the usual practice of shipping an application complete with the user interface in one integrated package, i.e., using the external resource files primarily in developing or porting an application but releasing a compiled version of the product. Providing an external resource data-containing file allows a user to modify the user interface to suit personal preferences without having to provide a plethora of detailed parameters. Such a user can instead rely on the built in defaults to provide the missing parameters, i.e. attribute values, in the context of the parsed tree with tags providing some of the nodes.

Figure 5A:
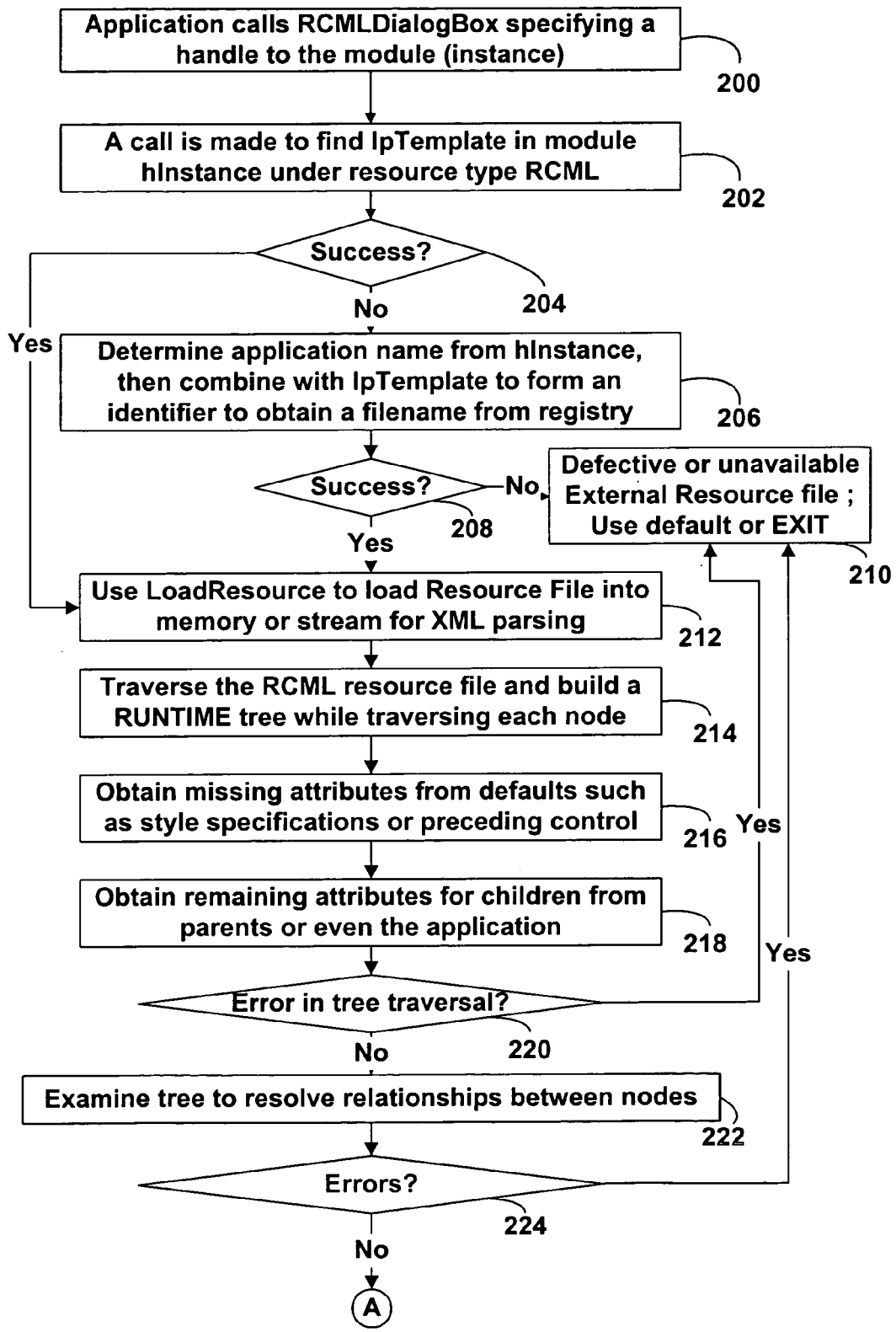
FIGS. 5A and 5B illustrate an embodiment in the "WIN-DOWS®" operating system environment.
Figure 5B:
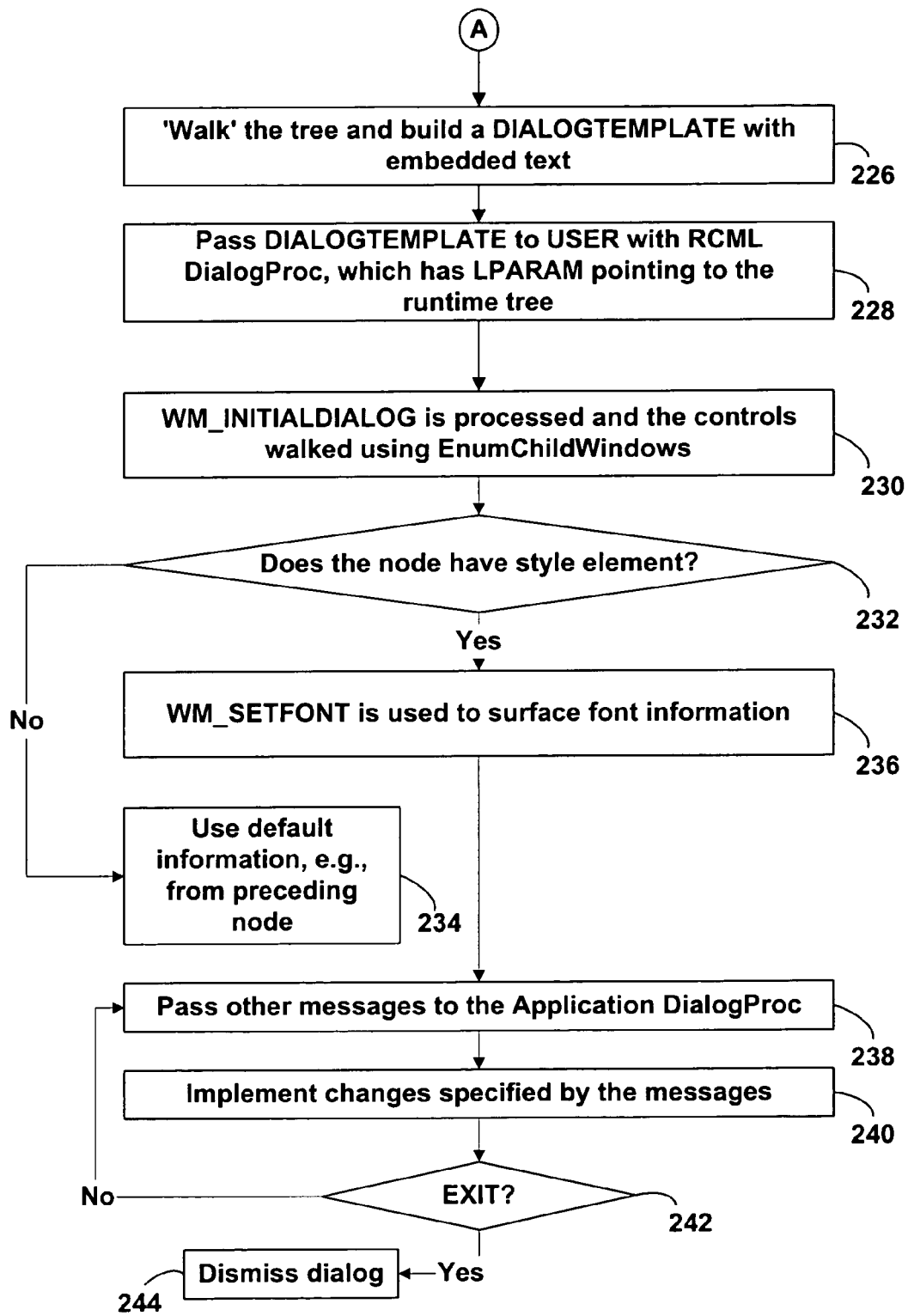

FIGS. 5A and 5B provide a detailed description of an embodiment in the "WINDOWS®" operating system environment. However, this description is not intended to exclude other operating systems such as the "MACINTOSH®," "SOLARIS®" and other UNIX based platforms or distributed computing.

A convenient starting point is the identification of a need for a resource by an application. The application calls the operating system, termed USER, and eventually a call is made to RCMLDialogBox with a handle to the instance of the application making the original request (step 200). This is followed by a call being made to find lpTemplate, which is the dialog identifier, in the module hInstance under the resource type RCML (step 202). If the call does not succeed (step 204) then the application name is determined from hInstance and combined with lpTemplate to form an identifier followed by searching the registry for the application name (step 206). Success in obtaining the application name is evaluated at step 208. The inability to obtain an application name means that an external resource file is not available (step 210) and an error or exit message is generated. However, success in obtaining the name of the application (step 208) or the resource (step 204) leads to loading the resource in memory (step 212).

The resource is traversed and parsed in accordance with the XML handling procedures to build a runtime tree (step 214). Logging is performed at this stage to help RCML authors. Attributes that are needed but not specified are defaulted in accordance with the style specification, e.g., height, width and the like (step 216). Attributes for child nodes in the tree are inferred from the parent nodes, e.g., they use the same color as the parent node control (step 218). Each node in the runtime tree represents an element and provides access to its children and attributes. If the parsing step fails, an error in the markup language is indicated and again the program exits (step 220). Successful tree construction leads to an examination of the relationships between the node in the tree (step 222). Detection of errors results in termination of further processing (step 224).

Success at step 224, i.e., no errors are detected leads to FIG. 6B. The tree is "walked," which is a term of art, and each node is used to build a DIALOGTEMPLATE. Extraneous text and attributes are embedded to permit processing beyond that foreseen by the RCML schema and the loader (step 226). This DIALOGTEMPLATE is passed to USER, which is code for generating and controlling graphical elements, with RCML DialogProc with LPARAM pointing to the runtime tree (step 228). The operating system calls DialogProc back and the DialogProc handles the messages WM_INITIALDIALOG, where "WM" signifies a message from the operating system (step 228). As may be expected, messages from particular dialog boxes to the operating system, and eventually to the application, have their own prefixes.

Following the processing of WM_INITIALDIALOG the controls are walked using EnumChildWindows (step 230). Following this, whether the node has an associated child element is determined (step 232). If there is no style element, other defaults such as the font, e.g., in the style specification or as used in the last control element, or as specified in the execution context due to accessibility reasons etc., is invoked (step 234). If there is an associated style element then WM_SETFONT surfaces the Font information (236).

Similarly, other messages are passed to the application's DialogProc (step 238). It is important to pass these messages and the LPARAM is saved for providing the application's DialogProc with a reference to the runtime tree in the messages. The changes specified by the messages are implemented (step 240) followed by further processing by using messages if there is no exit (step 242). In the case of an exit, the dialog is dismissed (step 244). It is to be noted that the controls implemented often are dynamic and are changed by messages received from the operating system while sending messages to the application in response to events and the like.

To summarize, there are at least three kinds of default parameter specifications possible on most platforms. First is the schema default, which is invoked in course of interpreting the markup language, e.g., the XML based RCML language. Schema defaults may be relative to the particular platform or specified in absolute units in the schema. As an example, setting WIDT="DEFAULT" may mean using the platform default while omitting the WIDTH attribute may invoke the schema default. Second is the tree building set of defaults, which are relative to previously assigned values for already parsed nodes. Finally, there are the execution defaults. These reflect preferences and settings for particular users. Illustrative examples include users needing large sized fonts that can be automatically implemented as defaults. Furthermore, the application program may include default values that can be used if there are no external resource data available.

Thus, embodiments, in accordance with the invention, reduce the need to code the default properties of resources and provide for defaults in a variety of ways. The defaults may be derived from a style specification, a preceding control or a parent node. This is beneficial not only for those not experienced in programming, but also reduces the tedious task of initializing each control with repetitive data for the developers.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A system for collaboratively developing a computer application software product, the system comprising:
    a first computer and a second computer linked by way of a network;
    a first set of one or more computer programs embodied in a computer-readable medium used by a first system user operating the first computer for producing an executable program component of the computer application software product;
    at least one user interface resource file embodied in a computer-readable medium, the at least one user interface resource file comprising a document in a markup language, wherein tagged text elements are associated with attributes of a user interface component of the computer application software product and the markup language includes a plurality of resource tag attribute default value mechanisms whose order corresponds to a precedence order of default values for the attributes, the precedence order of default values comprising first using an attribute value associated with a previous occurrence of a tag in a tree if the tag is not provided with an overriding attribute, then using a default attribute value if no previous occurrence of the tag is present in the tree, if an acceptable attribute value comprising an attribute value causing non-overlapping controls is not obtained by the attribute value associated with the previous occurrence of the tag in the tree or the default attribute value, then using an attribute provided by one of the application or the user wherein the user interface resource file includes tags not specified in a schema or a document type definition if the acceptable attribute value is not obtained by the attribute value associated with the previous occurrence of the tag in the tree or the default attribute value wherein the acceptable attribute value not being obtained by the attribute value associated with the previous occurrence of the tag comprises the attribute value associated with the previous occurrence of the tag causing overlapping controls; and
    a second set of one or more computer programs embodied in a computer-readable medium used by a second system user operating the second computer for creating and modifying the user interface component by manipulating the at least one user interface resource file, wherein the creating and modifying by the second system user are independent of actions taken by the first system user.

2. The system of claim 1 wherein the second set of one or more computer programs is used while the computer application software product is being executed, the creating and modifying occurring dynamically, and not requiring a recompilation of the executable program component.

3. The system of claim 1, further comprising a set of operating system resource-loading routines embodied in a computer-readable medium for presenting a user interface corresponding to the user interface component to a third system user.

4. The system of claim 3 wherein the resource-loading routines obtain user interface resource information from a user interface attribute data tree corresponding to the user interface resource file and, with respect to resource information not specified in the user interface resource file, from a set of default sources of user interface resource information.

5. The system of claim 3 wherein the third system user is also the first system user.

6. The system of claim 3 wherein the third system user is also the second system user.

7. The system of claim 3 wherein the third system user is neither the first system user nor the second system user.

8. A system for customizing a user interface for an executable computer program by a user of the program, the system comprising:
    a computer operated by the user, the computer including a memory in which the executable computer program is stored;
    at least one user interface resource file embodied in a computer-readable medium, comprising a document in a markup language, wherein tagged text elements are associated with attributes of the user interface and the markup language includes a plurality of resource tag attribute default value mechanisms whose order corresponds to a precedence order of default values for the attributes, the precedence order of default values comprising first using an attribute value associated with a previous occurrence of a tag in a tree if the tag is not provided with an overriding attribute, then using a default attribute value if no previous occurrence of the tag is present in the tree, if an acceptable attribute value comprising an attribute value causing non-overlapping controls is not obtained by the attribute value associated with the previous occurrence of the tag in the tree or the default attribute value, then using an attribute provided by one of the application or the user wherein the user interface resource file includes tags not specified in a schema or a document type definition if the acceptable attribute value is not obtained by the attribute value associated with the previous occurrence of the tag in the tree or the default attribute value wherein the acceptable attribute value not being obtained by the attribute value associated with the previous occurrence of the tag comprises the attribute value associated with the previous occurrence of the tag causing overlapping controls; and a set of one or more computer programs, embodied in a computer-readable medium, for modifying the at least one user interface resource file.

9. The system of claim 8 wherein the set of one or more computer programs for modifying the at least one user interface resource file is invoked while the computer program is being executed, the customizing occurring dynamically.

10. The system of claim 8, further comprising a set of operating system resource-loading routines embodied in a computer-readable medium for presenting the user interface to the user, wherein the resource-loading routines obtain user interface resource information from a user interface attribute data tree corresponding to the user interface resource file and, with respect to resource information not specified in the user interface resource file, from a set of default resources of user interface resource information.

11. The system of claim 8, wherein:
a parse tree is generated for the markup language of the document of each user interface resource file; and
the ordered plurality of resource tag attribute default value mechanisms comprises a preceding control default value mechanism that enables at least one attribute value of a first resource tag to be derived from at least one attribute value of a like resource tag situated earlier in the parse tree.

12. The system of claim 11, wherein the ordered plurality of resource tag attribute default value mechanisms further comprises a parent node default value mechanism that enables the at least one attribute value of the first resource tag to be derived from at least one attribute value of a parent resource tag that is a parent of the first resource tag in the parse tree.

13. The system of claim 12, wherein:
the markup language of the document of each user interface resource file is interpreted in accordance with a schema; and
the ordered plurality of resource tag attribute default value mechanisms further comprises a style specification default value mechanism that enables the at least one attribute value of the first resource tag to be derived from a default style specification in the schema.

14. The system of claim 13, wherein the preceding control default value mechanism takes precedence over the style specification default value mechanism.

15. A method for collaboratively developing a computer application software product by at least two system users, the computer application software product including a user interface, the method comprising:
by a first system user, writing source code for the computer application software product, and generating a first build of the computer application software product; and
by a second system user,
executing the first build, thereby causing the user interface to be presented;
proposing changes to the user interface;
if the proposed changes require the first system user to rewrite the source code and generate a second build, communicating the proposed changes to the first system user; and
if the proposed changes do not require the first system user to rewrite the source code and generate a second build, editing at least one user interface resource file to incorporate the proposed changes, each user interface resource file comprising symbols of a markup language having a plurality of resource tag attribute default value mechanisms whose order corresponds to a precedence order of a default values for the attributes, the precedence order of default values comprising first using an attribute value associated with a previous occurrence of a tag in a tree if the tag is not provided with an overriding attribute, then using a default attribute value if no previous occurrence of the tag is present in the tree, if an acceptable attribute value comprising an attribute value causing non-overlapping controls is not obtained by the attribute value associated with the previous occurrence of the tag in the tree or the default attribute value, then using an attribute provided by one of the application or the user wherein the user interface resource file includes tags not specified in a schema or a document type definition if the acceptable attribute value is not obtained by the attribute value associated with the previous occurrence of the tag in the tree or the default attribute value, and causing a new user interface to be presented wherein the acceptable attribute value not being obtained by the attribute value associated with the previous occurrence of the tag comprises the attribute value associated with the previous occurrence of the tag causing overlapping controls.

16. The method of claim 15 wherein the at least one user interface resource file comprises a document in a markup language, wherein tagged text elements are associated with attributes of the user interface.

17. The method of claim 15 wherein the causing the user interface to be presented comprises:
parsing the at least one user interface resource file into a user interface attribute data tree;
invoking operating system resource-loading routines for constructing the user interface; and
obtaining user interface resource information from the user interface attribute data tree and, with respect to resource information not specified in the user interface resource file, from a set of default sources of user interface resource information.

18. The method of claim 15 wherein the causing the user interface to be presented occurs while the first build is being executed and does not require the first build to be re-executed.

19. A computer-readable medium storing computer-executable instructions for performing a method for collaboratively developing a computer application software product having a user interface, the method comprising:

executing a first build of the computer application software product;

opening at least one user interface resource file specifying characteristics of the user interface, so that the at least one user interface resource file may be edited by a user to effect changes to the user interface, each user interface resource file comprising symbols of a markup language having a plurality of resource tag attribute default value mechanisms whose order corresponds to a precedence order of default values for the attributes, the precedence order of default values comprising first using an attribute value associated with a previous occurrence of a tag in a tree if the tag is not provided with an overriding attribute, then using a default attribute value if no previous occurrence of the tag is present in the tree, if an acceptable attribute value comprising an attribute value causing non-overlapping controls is not obtained by the attribute value associated with the previous occurrence of the tag in the tree or the default attribute value, then using an attribute provided by one of the application or the user wherein the user interface resource file includes tags not specified in a schema or a document type definition if the acceptable attribute value is not obtained by the attribute value associated with the previous occurrence of the tag in the tree or the default attribute value wherein the acceptable attribute value not being obtained by the attribute value associated with the previous occurrence of the tag comprises the attribute value associated with the previous occurrence of the tag causing overlapping controls; and causing a new user interface incorporating the changes to be presented, without requiring a recompilation of the computer application software product.

20. The medium of claim 19, wherein:

a parse tree is generated for the markup language of each user interface resource file; and the ordered plurality of resource tag attribute default value mechanisms comprises a preceding control default value mechanism that enables at least one attribute value of a first resource tag to be derived from at least one attribute value of a like resource tag situated earlier in the parse tree.

21. The medium of claim 20, wherein the ordered plurality of resource tag attribute default value mechanisms further comprises a parent node default value mechanism that enables the at least one attribute value of the first resource tag to be derived from at least one attribute value of a parent resource tag that is a parent of the first resource tag in the parse tree.

22. The medium of claim 21, wherein:

the markup language of each user interface resource file is interpreted in accordance with a schema; and the ordered plurality of resource tag attribute default value mechanisms further comprises a style specification default value mechanism that enables the at least one attribute value of the first resource tag to be derived from a default style specification in the schema.

23. A method for customizing a user interface for an executable computer program by a user of the program, the method comprising:

executing the computer program, thereby causing the user interface to be presented;

editing at least one user interface resource file, the at least one user interface resource file comprising a document in a markup language, wherein tagged text elements are associated with attributes of the user interface and the markup language includes a plurality of resource tag attribute default value mechanisms whose order corresponds to a precedence order of default values for the attributes, the precedence order of default values comprising first using an attribute value associated with a previous occurrence of a tag in a tree if the tag is not provided with an overriding attribute, then using a default attribute value if no previous occurrence of the tag is present in the tree, if an acceptable attribute value comprising an attribute value causing non-overlapping controls is not obtained by the attribute value associated with the previous occurrence of the tag in the tree or the default attribute value, then using an attribute provided by one of the application or the user wherein the user interface resource file includes tags not specified in a schema or a document type definition if the acceptable attribute value is not obtained by the attribute value associated with the previous occurrence of the tag in the tree or the default attribute value wherein the acceptable attribute value not being obtained by the attribute value associated with the previous occurrence of the tag comprises the attribute value associated with the previous occurrence of the tag causing overlapping controls; and causing a new user interface to be presented.

24. The method of claim 23, wherein the causing the user interface to be presented comprises:

parsing the at least one user interface resource file into a user interface attribute data tree;

invoking operating system resource-loading routines for constructing the user interface; and obtaining user interface resource information from the user interface attribute data tree and, with respect to resource information not specified in the user interface resource file, from a set of default sources of user interface resource information.

25. The method of claim 23 wherein the causing the user interface to be presented occurs while the computer program is being executed and does not require the computer program to be re-executed.

26. A computer-readable medium storing computer-executable instructions and computer-readable data for performing the method of claim 23.

* * * * *